(12) United States Patent
Lo

(10) Patent No.: US 11,580,208 B2
(45) Date of Patent: *Feb. 14, 2023

(54) SYSTEM AND METHOD FOR PIN ENTRY ON MOBILE DEVICES

(71) Applicant: BBPOS Limited, Tsuen Wan (HK)

(72) Inventor: Chi Wah Lo, Hong Kong (HK)

(73) Assignee: STRIPE, INC., South San Fransico, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/113,683

(22) Filed: Dec. 7, 2020

(65) Prior Publication Data

US 2021/0117531 A1 Apr. 22, 2021

Related U.S. Application Data

(63) Continuation of application No. 16/440,661, filed on Jun. 13, 2019, now Pat. No. 10,867,027, which is a
(Continued)

(51) Int. Cl.
*G06F 21/35* (2013.01)
*G06F 3/01* (2006.01)
(Continued)

(52) U.S. Cl.
CPC .............. *G06F 21/35* (2013.01); *G06F 3/013* (2013.01); *G06F 3/0233* (2013.01); *G06F 3/038* (2013.01);
(Continued)

(58) Field of Classification Search
CPC .......... G06F 21/35; G06F 21/31; G06F 21/72; G06F 3/013; G06F 3/0233; G06F 3/038;
(Continued)

(56) References Cited

U.S. PATENT DOCUMENTS 10,108,796 B2 * 10/2018 Lo ..................... G06F 3/0233
10,409,976 B2 * 9/2019 Lo ..................... G06F 21/72
(Continued)

FOREIGN PATENT DOCUMENTS

CN 201035502 3/2008
CN 101695066 A 4/2010
(Continued)

OTHER PUBLICATIONS

China: Office Action of CN 201810750445X (related application); dated Jan. 6, 2020 (8 pages).
(Continued)

*Primary Examiner* — Mohammad A Siddiqi
(74) *Attorney, Agent, or Firm* — Womble Bond Dicksinson (US) LLP

(57) ABSTRACT

A system for entering a secure Personal Identification Number (PIN) into a mobile computing device includes a mobile computing device and a peripheral device that are connected via a data communication link. The mobile computing device includes a mobile application and a display and the mobile application runs on the mobile computing device and displays a grid on the mobile computing device display. The peripheral device includes a display and an encryption engine, and the peripheral device display displays a grid corresponding to the grid displayed on the mobile computing device display. Positional inputs on the mobile computing device grid are sent to the peripheral device and the peripheral device decodes the positional inputs into PIN digits and generates an encrypted PIN and then sends the encrypted PIN back to the mobile computing device.

20 Claims, 3 Drawing Sheets

Related U.S. Application Data continuation of application No. 16/165,226, filed on Oct. 19, 2018, now Pat. No. 10,409,976, which is a continuation of application No. 14/100,076, filed on Dec. 9, 2013, now Pat. No. 10,108,796.

(60) Provisional application No. 61/736,116, filed on Dec. 12, 2012.

(51) Int. Cl.

| | |
|---|---|
| G06F 3/023 | (2006.01) |
| G06F 3/038 | (2013.01) |
| G06F 3/0488 | (2022.01) |
| G06F 21/31 | (2013.01) |
| G06F 21/72 | (2013.01) |
| H04W 12/06 | (2021.01) |
| H04W 12/12 | (2021.01) |
| G06F 3/04886 | (2022.01) |
| H04W 12/77 | (2021.01) |

(52) U.S. Cl.
CPC .......... *G06F 3/04886* (2013.01); *G06F 21/31* (2013.01); *G06F 21/72* (2013.01); *H04W 12/06* (2013.01); *H04W 12/12* (2013.01); G06F 2203/0383 (2013.01); *H04W 12/77* (2021.01)

(58) Field of Classification Search
CPC ........ G06F 3/04886; G06F 2203/0383; H04W 12/06; H04W 12/12
See application file for complete search history.

(56) References Cited

U.S. PATENT DOCUMENTS

| | | | |
|---|---|---|---|
| 10,614,462 B2 | 4/2020 | Johnson | |
| 10,867,027 B2 * | 12/2020 | Lo | ........................ H04W 12/12 |
| 2006/0053301 A1 | 3/2006 | Shin | |
| 2006/0255128 A1 | 11/2006 | Johnson et al. | |
| 2007/0174615 A1 | 7/2007 | Ballou et al. | |
| 2008/0258940 A1 | 10/2008 | Ding et al. | |
| 2010/0054546 A1 | 3/2010 | Choi | |
| 2010/0138666 A1 | 6/2010 | Adams et al. | |
| 2011/0204140 A1 | 8/2011 | Hart et al. | |
| 2012/0047564 A1 * | 2/2012 | Liu | ........................ G07F 7/1091 726/6 |
| 2012/0104090 A1 * | 5/2012 | Gross | .................... G07F 19/206 235/379 |
| 2012/0180140 A1 | 7/2012 | Barrowman et al. | |
| 2012/0268393 A1 | 10/2012 | Lee | |
| 2012/0280923 A1 | 11/2012 | Vincent et al. | |
| 2013/0086389 A1 | 4/2013 | Suwald | |
| 2013/0127725 A1 | 5/2013 | Sugimoto | |
| 2013/0223279 A1 | 8/2013 | Tinnakornsrisuphap et al. | |
| 2013/0328801 A1 | 12/2013 | Quigley et al. | |
| 2013/0333011 A1 * | 12/2013 | Quigley | ............... G06Q 20/353 726/7 |
| 2014/0324708 A1 * | 10/2014 | McCauley | .......... H04W 12/068 705/72 |
| 2014/0365782 A1 | 12/2014 | Beatson et al. | |
| 2016/0275515 A1 | 9/2016 | Quigley et al. | |

FOREIGN PATENT DOCUMENTS

| | | |
|---|---|---|
| CN | 101695107 A | 4/2010 |
| CN | 102422302 A | 4/2012 |

OTHER PUBLICATIONS

Communication from a foreign patent office in a counterpart foreign application, The State Intellectual Property Office of People's Republic of China, "First Office Action," Chinese Application No. 201380065058.8, dated May 18, 2017, 9 pages.

* cited by examiner

SYSTEM AND METHOD FOR PIN ENTRY ON MOBILE DEVICES

CROSS-REFERENCE TO RELATED APPLICATIONS

This application is a continuation of U.S. patent application Ser. No. 16/440,661, filed Jun. 13, 2019, and entitled SYSTEM AND METHOD FOR PIN ENTRY ON MOBILE DEVICES, which is a continuation of U.S. Continuation application Ser. No. 16/165,226, filed Oct. 19, 2018, and entitled SYSTEM AND METHOD FOR PIN ENTRY ON MOBILE DEVICES), issued as U.S. Pat. No. 10,409,976 on Sep. 10, 2019, which is a continuation of U.S. patent application Ser. No. 14/100,076, filed on Dec. 9, 2013, entitled SYSTEM AND METHOD FOR PIN ENTRY ON MOBILE DEVICES and issued as U.S. Pat. No. 10,108,796, on Oct. 23, 2018, and which claims priority to and the benefit of U.S. Provisional Patent Application No. 61/736,116, filed on Dec. 12, 2012, entitled SYSTEM AND METHOD FOR PIN ENTRY ON MOBILE DEVICES, the specifications of which are incorporated by reference herein in their entirety.

TECHNICAL FIELD

The present invention relates to a system and a method for PIN entry on mobile computing devices.

BACKGROUND

Portable personal computing devices such as smart phones, Personal Digital Assistant, portable computers, tablet computers and audio devices such as digital music players have become ubiquitous in recent years. This opens up the possibility of many different mobile applications such as mobile banking, mobile payment, mobile commerce, and person-to-person money transfer, among others.

One of most important aspects of these applications is the authentication of the user and verification of the identity. In many systems, the authentication is done by using a 4 to 12 digits number called a Personal Identification Number (PIN). The PIN is a number known only to that person and not to anyone else. In multiple factor authentication systems, a combination of "something you know", "something you have" and "something you are" is used. "Something you have" can be a digital token, a card. "Something you are" is some biometrics like facial characteristics, fingerprints, voice, iris or retina scan or even DNA. PIN, password and personal information such as date of birth fall into the category of "something you know".

For payment cards, PIN is the most sensitive piece on information used for authentication. There are Payment Card Industry (PCI) regulations or other industrial standards that govern how the PIN should be handled by a terminal that accepts a PIN. In the past, PINs are entered by specially designed PIN-entry devices (PEDs). These PIN entry devices are tamper-resistant, and because of the stringent security requirements, are usually very expensive.

Accepting PIN entry by using software running on mobile devices and by using the keys or touch screens on the mobile devices are inherently insecure because of malwares, Trojan horses or hacked operating systems. It is possible that keyloggers and screen capturers can capture the user input and then send it to hackers. One of the challenges in the design of a mobile terminal is how to allow a mobile phone to accept a PIN securely. Therefore, there is a need for a system and a method for secure and yet convenient PIN entry.

SUMMARY

The invention provides a secure and convenient way for PIN entry on a mobile computing device with the use of a peripheral device.

In general, in one aspect, the invention features a system for entering a secure Personal Identification Number (PIN) into a mobile computing device. The system includes a mobile computing device and a peripheral device. The mobile computing device includes a mobile application and a display and the mobile application is configured to run on the mobile computing device and to display a grid on the mobile computing device display. The peripheral device includes a display and an encryption engine, and the peripheral device display is configured to display a grid corresponding to the grid displayed on the mobile computing device display. The peripheral device is connected to the mobile computing device via a data communication link. Positional inputs on the mobile computing device grid are configured to be sent to the peripheral device and the peripheral device is configured to decode the positional inputs into PIN digits and to generate an encrypted PIN and then to send the encrypted PIN back to the mobile computing device.

Implementations of this aspect of the invention may include one or more of the following features. The mobile application is configured to display the grid on the mobile computing device without showing any digits. The grid displayed on the peripheral device includes a randomized grid of digits. The grid displayed on the peripheral device is configured to randomize the position of each digit on the grid after each positional input. The encryption engine in the peripheral device is configured to store one or more cryptographic keys and the one or more cryptographic keys are used for encrypting PIN and/or data. The encryption engine in the peripheral device is configured to perform cryptographic operations comprising encryption, decryption, digital signature, hashing, and random number generation. The data communication link comprises a wired data communication link and the wired data communication link comprises one of USB, Firewire, RS232 or audio jack interface. The data communication link comprises a wireless data communication link and the wireless data communication link comprises one of WiFi, Bluetooth, Infrared, or NFC interface. The peripheral device comprises one of magnetic card reader, EMV card reader, NFC reader, keypad, or biometrics readers. The mobile computing device comprises one of mobile phones, personal digital assistants (PDAs), netbooks, tablet computers, notebook computers, electronic readers, digital music players, digital video players, or game consoles. Positional inputs on the mobile computing device are provided via one of touch screens, mouse clicks, track ball, or eyeball movement tracking devices.

In general, in one aspect, the invention features a method for entering a secure Personal Identification Number (PIN) into a mobile computing device including the following. Providing a mobile computing device comprising a mobile application and a display. The mobile application is configured to run on the mobile computing device and to display a grid on the mobile computing device display. Next, providing a peripheral device comprising a display and an encryption engine. The peripheral device display is configured to display a grid corresponding to the grid displayed on the mobile computing device display. The peripheral device is connected to the mobile computing device via a data communication lime Next, providing positional inputs on the mobile computing device and wherein the positional inputs are configured to be sent to the peripheral device and the peripheral device is configured to decode the positional inputs into PIN digits and to generate an encrypted PIN and then to send the encrypted PIN back to the mobile computing device.

The details of one or more embodiments of the invention are set forth in the accompanying drawings and description bellow. Other features, objects and advantages of the invention will be apparent from the following description of the preferred embodiments, the drawings and from the claims.

DETAILED DESCRIPTION

The present invention describes a system and the method for entering a PIN on mobile computing devices in a secure and convenient manner. A representation of a digits grid is shown on a peripheral device and the actual input captures are done on a separate mobile computing device. Positional information captured on the mobile computing device is mapped back into its PIN representation on the peripheral device. This separation adds another layer of security to the PIN input process that can help reduce the complexity of the design of both the mobile phone application and the peripheral device.

Figure 1:
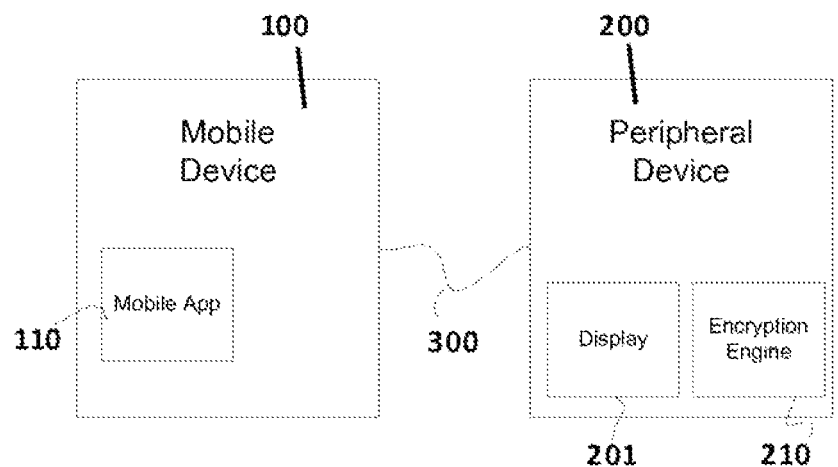
FIG. 1 shows a mobile computing device and a peripheral device connected together via the wired or wireless data communication link.

Referring to FIG. 1, a peripheral device 200 and a mobile computing device 110 are connected together through a data communication link 300. The data communication link 300 may be a wired connection or a wireless connection. The wired connection may be implemented via one of USB, Firewire, RS232 or audio jack interface. The wireless connection may be implemented via one of WiFi, Bluetooth, Infrared, NFC or other forms of data coupling.

Figure 2:
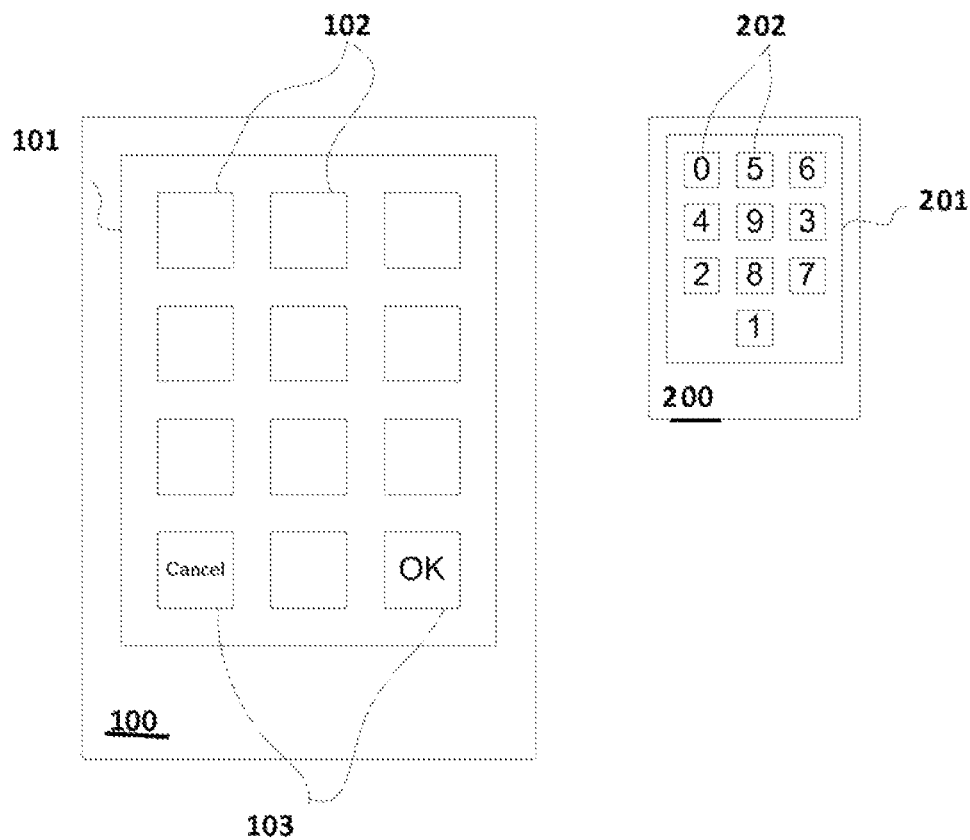
FIG. 2 shows a randomized key grid display on the peripheral device and a without the digits shown on the mobile computing device.

When PIN entry is required, the peripheral device 200 displays a randomized grid of digits 201 and keys 202, as shown in FIG. 2. A software application 110 on the mobile computing device 100 displays a corresponding grid 101 of the same arrangement without the digits shown on the key positions 102. The PIN is entered in the mobile computing device 100 by pressing the corresponding key positions 102 on the grid 101 shown on the mobile computing device 100 relative to the key positions 202 on the grid 201 shown on the peripheral device 200. After each key press on the mobile computing device grid 101, the position is sent to the peripheral device 200 and from the relative position of the key press, the PIN digits intended to be entered are computed by the peripheral device 200, processed and sent back to the mobile computing device100 in an encrypted or otherwise cryptographically secure format. In one example, the format is an Encrypted PIN Block (EPB) format. The EPB can be further transmitted to other parties such as a payment processor gateway for further processing.

The peripheral device 200 is used to generate and display a randomized grid of digits on its display 201. The display 201 may be one of LCD displays, LED displays, plasma or seven segment displays. In the peripheral device 200, there is an encryption engine 210 capable of decoding the inputs from the mobile application 110 and encode the PIN into a secure format such as an Encrypted PIN Block (EPB).

Mobile application 110 runs on the mobile computing device 100 and communicates with the peripheral device 200 through the data communication link 300. When PIN entry is required, the mobile application 110 tells the peripheral device 200 to generate and display the randomized number grid 201, as shown in FIG. 2. The mobile phone 100 displays a corresponding grid 101 without the numbers. Function keys 103, such as "Cancel", "Back", "OK" and "Enter" are also shown on the mobile phone 100.

When a user wants to enter a number, the corresponding position on grid 101 displayed by the mobile phone application 110 is pressed, touched or otherwise indicated by a position pointing device or methods. This position pointing device or method may be one of touch screens, mouse click, track ball, or eyeball movement tracking devices. In one example, pressing the top-right square on the grid 101 on the mobile phone 100 means the user intends to enter the digit "6", as shown in FIG. 2.

There are no numbers shown on the mobile phone grid display 101 and the mobile phone application 110 has no way of knowing what positions correspond to which numbers. In this way, even if the mobile phone 100 is infected with malware such as keyloggers and screen capturers, it will be impossible for the malware to recover the PIN entered.

Figure 3:
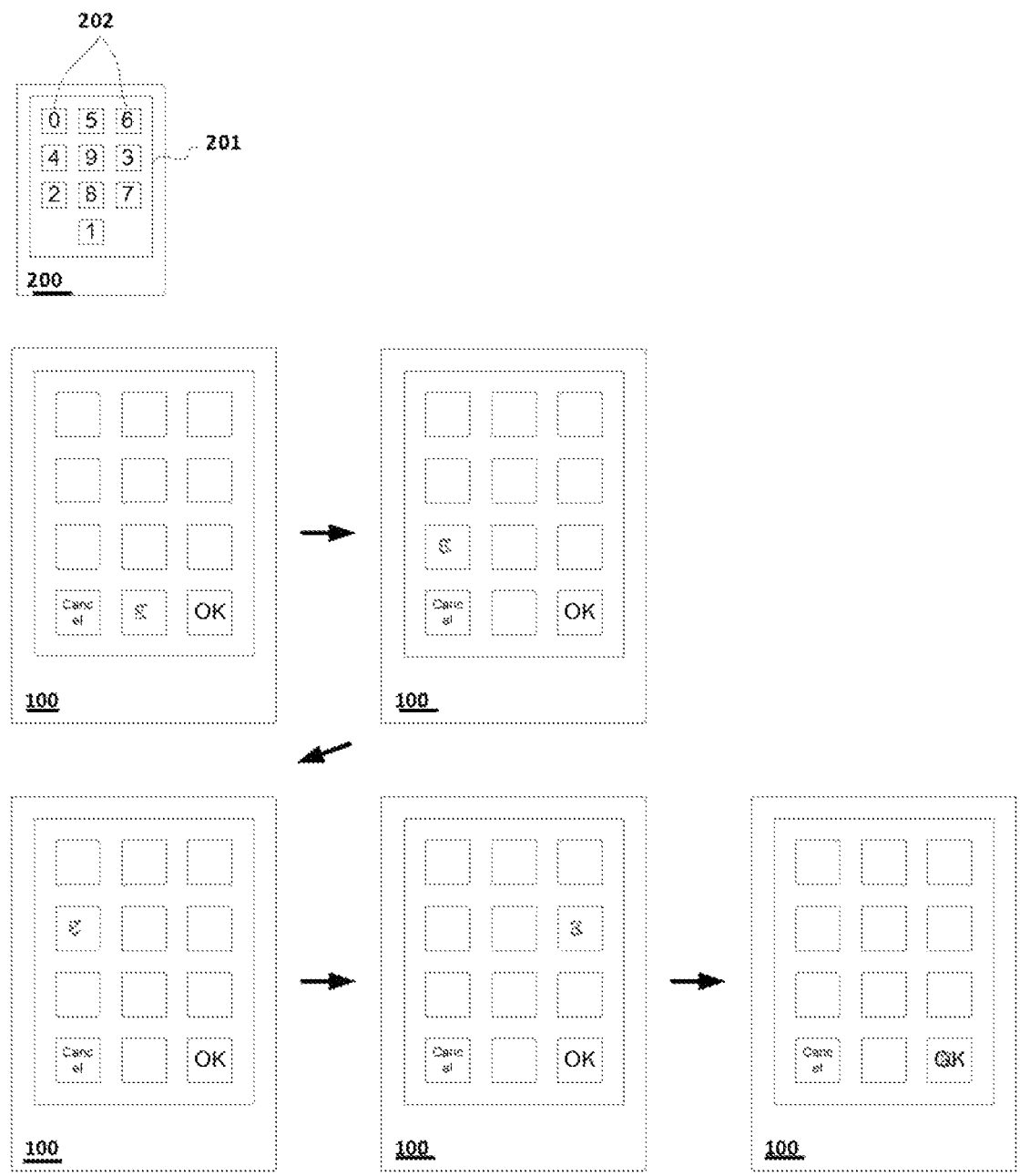
FIG. 3 illustrates the sequence of positions pressed on the mobile communication device grid to enter the PIN sequence "1243" using the randomized grid pattern in the peripheral device grid.

FIG. 3 illustrates the user actions to enter the PIN sequence "1243". The four positions corresponding to the "1", "2", "4" and "3" shown on the peripheral device 200 are pressed sequentially. After each key press, the mobile application 110 sends the position data to the peripheral device 200 and the peripheral device 200 uses the positional information to decode which digit is inputted. After the four PIN digits are entered, the "OK" key is pressed and the mobile application 110 tells the peripheral device 200 that all digits have been entered. The peripheral device 200 then processes and encrypts the input positions and sends back an encrypted output of the PIN.

In this example, the randomized grid 201 does not shuffle after each key press. However, in other examples grid 201 randomizes the position of the displayed digits after every keypress.

It is understood that the invention applies to all mobile computing devices including, but not limited to, mobile phones, personal digital assistants (PDAs), netbooks, tablet computers, notebook computers, electronic readers, digital music players, digital video players, game consoles, among others.

Several embodiments of the present invention have been described. Nevertheless, it will be understood that various modifications may be made without departing from the spirit and scope of the invention. Accordingly, other embodiments are within the scope of the following claims.

What is claimed is:

1. A method to enable entry of a secure credential, the method comprising:

providing a second device with an encryption engine to establish a data communication link with a first device, wherein the first device comprises a first display device, and the second device comprises a second display device;

enabling the second device to receive, via the data communication link, a request generated by an application running on the first device, wherein the application displays a first device grid on the first display device for positional input capture, and wherein the request is a request to generate a second device grid;

enabling generation and display of the second device grid on the second device display based on the received request, wherein the second device grid comprises a representation of a digits grid, wherein the representation is not displayed on the first device grid, and wherein the displaying of the representation enables secure entry of positional inputs on the first device grid;

enabling the second device to receive the positional inputs captured from the first device grid;

enabling the second device to decode at least one of the received positional inputs into digits related to the credential;

enabling the encryption engine to generate an encrypted credential from the decoded digits related to the credential; and enabling the second device to transmit the encrypted credential back to the first device.

2. The method of claim 1, wherein the credential comprises a PIN or a password.

3. The method of claim 1, wherein the first device is related to a user, and the credential is related to information known to the user.

4. The method of claim 1, wherein the application displays the first device grid on the first display device without showing any digits.

5. The method of claim 1, wherein the second device grid comprises a randomized grid of digits.

6. The method of claim 1, further comprising randomizing a position of each digit in the digits grid after each of the positional inputs.

7. The method of claim 1, wherein the data communication link comprises one of a USB, Firewire, RS232, audio jack, WiFi, Bluetooth, infrared, or NFC interface.

8. A system for secure entry of a credential at a first device comprising a first display device, the system comprising:

a second device including a second display device and an encryption engine, wherein an application runs on the first device and displays a first device grid for positional input capture on the first display device, and wherein:

the second device couples to the first device via a data communication link, the second device receives a request from the application to generate and display a second device grid, wherein the request is transmitted via the data communication link, the second device generates the second device grid, the second device displays the generated second device grid based on the received request, wherein the second device grid comprises a representation of a digits grid not displayed on the first device grid, and wherein the displaying of the representation of the digits grid enables a user to securely enter positional inputs on the first device grid, the second device receives the positional inputs from the first device, the second device decodes at least one of the received positional inputs into digits related to the credential, the second device generates, via the encryption engine, an encrypted credential from the decoded digits related to the credential, and the second device transmits the encrypted credential to the first device.

9. The system of claim 8, wherein the credential comprises a PIN or a password.

10. The system of claim 8, wherein the first device is related to the user, and the credential is related to information known to the user.

11. The system of claim 8, wherein the second device comprises one of magnetic card reader, EMV card reader, NFC reader, keypad, or biometrics readers.

12. The system of claim 8, wherein the first device comprises one of:
a mobile phone;
a personal digital assistant (PDAs);
a netbook;
a tablet computer;
a notebook computer;
an electronic reader;
a digital music player;
a digital video player; or
a game console.

13. The system of claim 8, wherein the positional inputs on the first device are provided via one of:
a touch screen;
a mouse click;
a track ball; or
an eyeball movement tracking device.

14. A system for entry of a secure credential using a first device including a first display device, and a second device including a second display device and an encryption engine, the system comprising:

the first device, wherein the first device comprises an application, wherein:

the application displays a first device grid on the first display device for positional input capture;

the application generates a request to generate a second device grid;

the application transmits the request over a data communication link to the second device, wherein, based on the transmission of the request, the second device grid generates and displays the second device grid on a peripheral device display in response to the request, wherein the second device grid includes a representation of a digits grid not displayed on the first device grid, and wherein the displaying of the representation of the digits grid enables secure entry of positional inputs on the first device grid;

the application transmits positional inputs captured from the first device grid to the second device, wherein based on the transmission of the positional inputs, the second device decodes at least one of the positional inputs into digits related to the credential and generates an encrypted credential using the encryption engine; and the application receives, from the second device, the encrypted credential.

15. The system of claim 14, wherein the credential comprises a PIN or a password.

16. The system of claim 14, wherein the first device is related to a user, and the credential is related to information known to the user.

17. The system of claim 14, wherein the encryption engine performs at least one cryptographic operation and stores one or more cryptographic keys.

18. The system of claim 14, wherein the first device is a mobile device.

19. The system of claim 14, wherein the second device is a peripheral device.

20. The system of claim 17, wherein the one or more cryptographic keys are used to generate the encrypted credential.

* * * * *